(12) United States Patent
Shilts et al.

(10) Patent No.: US 6,237,060 B1
(45) Date of Patent: May 22, 2001

(54) CACHE MANAGEMENT TECHNIQUES

(75) Inventors: Matthew F. Shilts, San Jose; Michael R. Allen, Redwood City, both of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/298,628

(22) Filed: Apr. 23, 1999

(51) Int. Cl.$^7$ ........................................ G06F 12/02

(52) U.S. Cl. .................... 711/100; 711/117; 711/118; 711/133; 711/135; 711/136; 711/159; 711/160; 707/206; 707/501; 709/213; 709/216; 709/227; 709/203

(58) Field of Search ......................... 707/206, 205, 707/501; 711/133, 135, 136, 159, 160, 132, 171, 100, 117, 118; 709/213, 216, 203, 227

(56) References Cited

FOREIGN PATENT DOCUMENTS

99/10811 * 3/1999 (WO) .

OTHER PUBLICATIONS

Wilson, P. Uniprocessor garbage collection techniques. In International Workshop on Memory Management. France, Sep. 1992. [Online] http://citeseer.nj.nec.com/wilson92uniprocessor.html.*
Jones R. The Garbage Collection Bibliography. [Online] http://www.cs.ukc.ac.uk/people/staff/rej/gcbib/gcbib.html.*

* cited by examiner

Primary Examiner—Do Hyun Yoo
Assistant Examiner—Yamir Encarnación
(74) Attorney, Agent, or Firm—Beyer Weaver & Thomas LLP

(57) ABSTRACT

In general, a method and apparatus for managing available cache memory in a browser are disclosed. Any document stored in a cache memory not having associated with it a strong reference is subject to being reclaimed by a garbage collector. The most recently requested documents, however, are stored in the cache memory with strong references associated therewith thereby precluding them from being reclaimed until such time as the strong reference is abolished. The strong reference is abolished when the document identifier associated with the document stored in the cache memory is not present in the document stack. Therefor, only the most recently requested documents remain stored in the cache memory depending upon the depth of the document stack.

14 Claims, 9 Drawing Sheets

CACHE MANAGEMENT TECHNIQUES

BACKGROUND OF THE INVENTION

1. Field of Invention

The invention relates generally to memory systems. More particularly, methods and apparatus for managing the available memory space in a cache memory is disclosed.

2. Description of Relevant Art

The explosive growth in Internet traffic has made it critical to look for ways of accommodating the increasing number of users while preventing excessive delays, congestion and widespread blackouts. For the past several years a large proportion of Internet traffic has been generated by web-browsing and most of the web browsing traffic is in turn comprised of images. This trend will continue with more sites becoming media rich as the users' access bandwidths increase and media-enabled PCs become more common. This has led to a great deal of effort being devoted to studying web caching techniques.

One such web caching technique is referred to as proxy based caching. With proxy based caching, clients can designate a host to serve as a proxy for all or some of their requests (e.g., http, ftp, etc). The proxy acts as a cache by temporarily storing on local disks, or memory, objects that were requested by the clients. It should be noted that in the context of the Internet, an object is a file, text, image, audio, executable program, and the like which is available to be downloaded by a client. When one of the clients sharing the proxy generates a request, the proxy searches its local storage for the requested object. If the object is available locally (hit) it is sent to the client, otherwise (miss) the request is passed on to the remote server or to another proxy server, if the proxy cache belongs to a hierarchy of caches. Unfortunately, if the ratio of number of misses to hits is even relatively small, then the performance of the browser can be substantially degraded as the requested documents must be retrieved from other proxies or the remote servers.

Another well known web caching technique used to improve performance is referred to as client side caching. Client side caching is the temporary storage of web objects (such as HTML documents) in local cache memory for later retrieval. Advantages to client side caching include: reduced bandwidth consumption since fewer requests and responses that need to go over the network are created, reduced server load since fewer requests for a server to handle are made, and reduced latency since responses for cached requests are available immediately and closer to the client being served. In most cases, client side caching can be performed by the client application and is built into, for example, Netscape's Communicator, Microsoft's Internet Explorer, various Java browsers, as well as most other web browsers.

Since web browsers (and the computers that support them) have only finite disk space, they must eventually discard old copies of stored documents to make room for new requests. Most systems use a policy based on discarding the least recently requested document as being the least likely to be requested again in future. Given sufficient disk space, documents are discarded around the time when they would, in any case, have been replaced by a more up-to-date version. However, if disk space is insufficient then the cache may be forced to discard a current document and make an unnecessary connection to the source host when the document is next requested. The amount of disk space required depends on the number of users served and the number of documents requested. Ideally a cache should have room to store every document which the users of the cache request more than once during the lifetime of the document. Such a cache would never retrieve a second copy of an unchanged document and thereby generate the minimum possible network traffic. To achieve this in practice would, of course, involve storing every requested document locally since there is no way to predict which documents will be re-read in the future.

Since storing every requested document for at least its lifetime is impractical, the number of documents which must be reclaimed (or garbage collected) from the cache memory is directly related to the available cache memory space. As is well known in the art, garbage collection is a process whereby inactive, or otherwise unneccessary objects, are identified, collected, and deactivated. If too many documents, or if those documents which are frequently requested are garbage collected, system performance is degraded since the document must be retrieved from the network if it is not stored in the local cache memory. Conversely, if documents that are not frequently requested are not periodically garbage collected, then the limited memory space available in the local cache memory can be quickly saturated. When this occurs, no new documents can be stored and, again, system performance is degraded since requested documents not stored in the local cache memory must again be retrieved from the network.

Therefore, what is desired is an efficient method and apparatus for intelligently purging documents from a local cache memory in a browser environment based upon the available cache memory and browser traffic.

SUMMARY OF THE INVENTION

Broadly speaking, the invention relates to an improved method, apparatus and computer system for efficiently managing available memory space in a cache memory. The invention can be implemented in numerous ways, including as a method, a computer system, and an apparatus. Several embodiments of the invention are discussed below.

According to one aspect of the present invention, a computer-implemented cache memory manager is disclosed. The cache memory manager includes a document key stack having a depth of stack locations each being arranged to store a document key associated with a document stored in the cache memory indicating the associated document has a strong reference associated with it. The manager also includes a master document file having a plurality of file locations each being arranged to store a document identifier used to uniquely identify an associated document stored in the cache memory indicating the associated document has only a weak reference associated with it. A garbage collector is also included that reclaims those documents stored in the cache memory that are only weakly referenced and not those documents that are strongly referenced. In this way, cache memory space commensurate with the reclaimed documents is periodically made available to store more recently requested documents.

In another embodiment, the number of stack locations are adjusted to provide sufficient cache memory space to accommodate the most recently requested files in the cache memory.

In another aspect of the invention, a method for managing available cache memory space in a cache memory is disclosed. If a document key associated with a requested document is present in the document key stack, then the document key associated with the requested document is moved to a first stack location. Those documents stored in the cache memory that do not have corresponding document keys present in the document key stack are reclaimed by the garbage collector, such that cache memory space commensurate with the reclaimed documents is periodically made available to store more recently requested documents.

These and other advantages of the present invention will become apparent upon reading the following detailed descriptions and studying the various figures of the drawings.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE EMBODIMENTS

Figure 1:
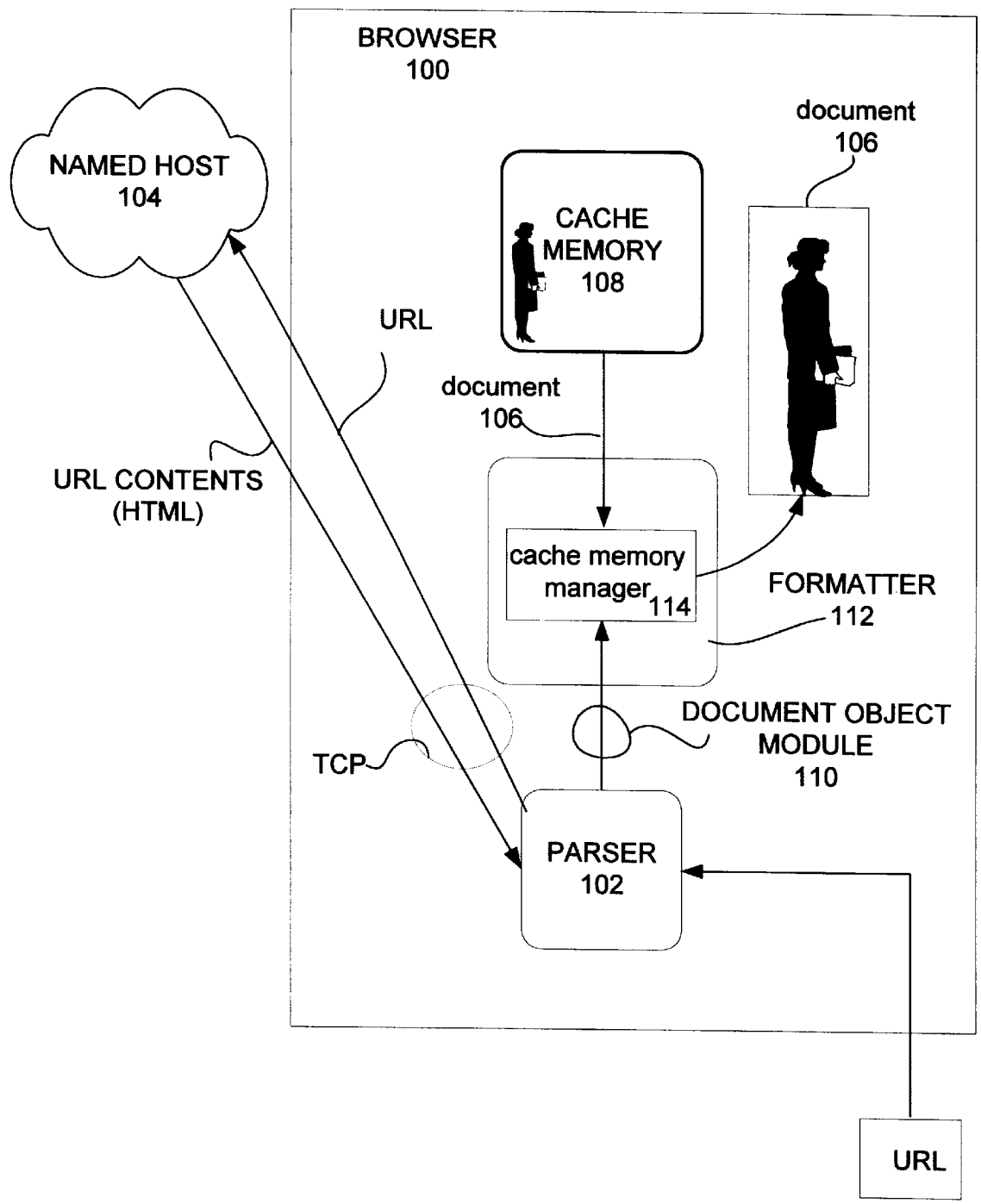
FIG. 1 shows a web browser incorporating a cache memory manager in accordance with an embodiment of the invention.

In the following description, frameworks and methods of cache memory management in browser environment are described. The invention will initially be described in terms of a browser application residing in a PC environment. In general, when a browser having a local cache memory receives a document request in the form of a document URL (universal resource locator), a determination is made whether or not a document key associated with the requested document is present in an adjustable document key stack. The document key is then moved to a first position in the stack indicating the requested document is the most recently requested document and is therefore the least likely document to be subject to being reclaimed during garbage collection. When there is not an associated document key present in the document key stack, a master document list is updated to include the requested document URL. A new document key, associated with the requested document URL, is then instantiated and inserted into the first position in the document key stack.

In one embodiment, any document stored in the local cache memory not having its corresponding document key in the document key stack is subject to being reclaimed during garbage collection. In this way, the number of reclaimable documents stored in the cache memory can be varied based upon the depth of (i.e., the number of available positions in) the document key stack. The depth of the document key stack can be determined by, for example, the amount of available cache memory space and/or browser traffic. In this way, browser performance can be improved by judiciously managing the number and types of documents residing in the local cache memory at any particular time.

In those situations where local cache memory is limited, which is common in embedded devices such as Internet telephones, and the like, the depth of the document key stack can be set shallow. By shallow, it is meant that the number of documents stored within the local cache memory that are not subject to garbage collection can be reduced such that substantial memory space can be periodically made available. On the other hand, in those situations where cache memory space is not strictly limited, or where system performance is a more important consideration then memory space availability, such as in PC browser-Internet applications, the depth of the document key stack can be increased. In this way, the local cache memory stores relatively more documents that are not subject to garbage collection providing enhanced system performance. System performance is enhanced since more of the recently requested documents are stored locally and can thus be retrieved without resorting to accessing the network or proxy cache memories.

Typically, the least recently accessed documents will be preferentially reclaimed from the local cache memory in order to accommodate those most recently requested documents. It should be noted, however, that any appropriate scheduling protocol can be followed as deemed appropriate for the application at hand.

Most web browsers have a very simple approach to networking as illustrated in FIG. 1. Given a browser 100 and a URL (universal resource locator) containing a host name and a document on that host, a parser 102 included in the browser 100 breaks up (parses) the URL into a named host portion 104 and a requested document portion 106. In one embodiment of the invention, the requested document 106 takes the form of HTML (Hyper Text Markup Language) statements well known to those skilled in the art.

In the case where the requested document is not stored in a local cache memory 108, the parser 102 makes a TCP ("transmission control protocol") connection to the named host portion 104 and retrieves the contents that include the document portion 106 of the requested URL. In one embodiment, the URL contents retrieved from the named host portion 104 includes those HTML statements corresponding to the requested document portion 106. The parser 102 uses the HTML statements corresponding to the requested document portion 106 to form what is referred to as an instance of the document object model (DOM) 110 that is passed to a formatter 112 which then appropriately displays the document.

In the case where the requested document portion 106 is found to be stored in the local cache 108, a cache memory manager 114 coupled to the formatter 112 retrieves the requested document 106 directly from the local cache memory 108 using appropriate document tags. The formatter 1 12 then appropriately displays the retrieved document 106. It should be noted that the cache memory manager 114 provides a garbage collection service that purges documents stored in the local cache memory 108 based upon the available cache memory as well as browser traffic. One cache memory management scheme used by the cache memory manager 114 preferentially excludes those most recently requested documents from being garbage collected. In one embodiment, the cache memory manager 114 varies the number and type of files subject to garbage collection based in part on the available cache memory space.

Figure 2:
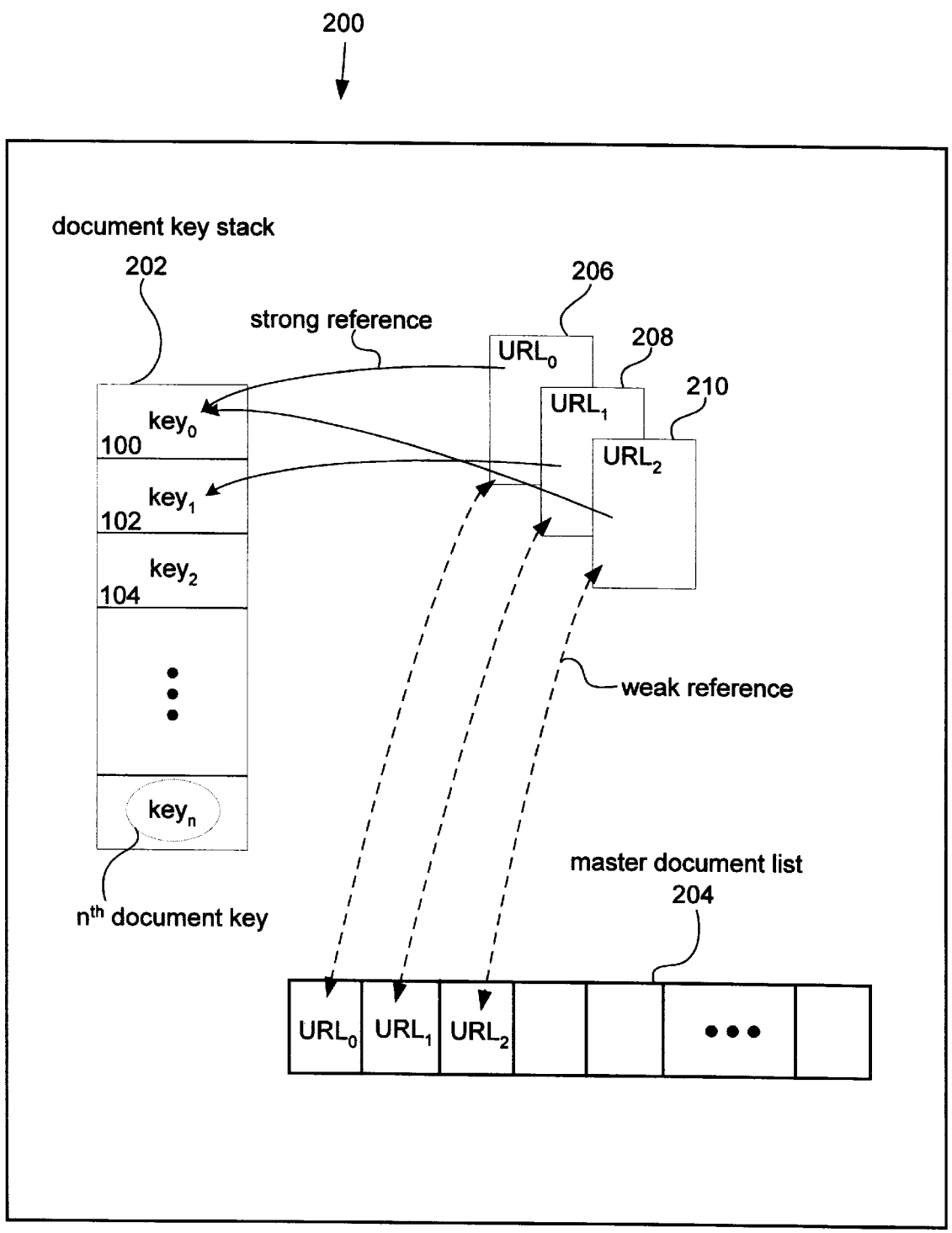
FIG. 2 illustrates a cache memory manager in accordance with an embodiment of the invention.

Referring now to FIG. 2, a cache memory manager 200 in accordance with an embodiment of the invention, is shown. It should be noted that the cache memory manager 200 is one embodiment of the cache memory manager 114 shown in FIG. 1. The cache memory manager 200 includes a document key stack 202. In one embodiment, the document key stack 202 is implemented as a self cleaning hash table suitable for use in a object oriented program and system, such as found in a Java Virtual Machine (JVM) environment. It should be noted that by self cleaning it is meant that the document keys associated with those documents reclaimed during garbage collection are purged (cleaned) from the document key stack 202. The cache memory manager 200 also includes a master document list 204 that is also implemented as a self cleaning hash table. In the described embodiment, the master document list 204 is arranged to store document identifiers, typically in the form of a document URL, associated with, for example, documents stored in the cache memory 108 represented by documents 206–210. Each of the documents 206–210 have an associated document identifier in the form of universal resource locators, URL0, URL$_1$, URL$_2$, respectively.

In one implementation of the invention, the document key stack 202 includes a number of available document key stack locations, such as 100–104, that are each used to store a document key corresponding to a particular document or documents currently stored in the local cache memory 108. By way of example, the document key stack location 100 contains a document key key$_0$ that corresponds to the document 206 having the universal resource locator URL$_0$, while the location 102 contains document key key$_1$ corresponding to the document 208 having the universal resource locator URL$_1$. In this way, each document stored in the local cache memory 108 can be uniquely identified by the combination of URL and document key, referred to as a document tag. By way of example, the document 206 has a corresponding document tag (URL$_0$, key$_0$), while the document 208 has a corresponding document tag (URL$_1$, key$_1$,). It should be noted, that in the described embodiment, the document 210 (having the universal resource locator URL$_2$) is also associated with the document key key$_0$. In this way, the size (i.e., the number of locations) of the document key stack 202 can be less than the total number of documents stored in the local cache memory 108.

In the described embodiment, the master document list 204 includes a document identifier, typically in the form of the universal resource locator URL, for every document stored in the local cache memory 108 or requested by the browser 100. By way of example, each of the documents 206–210 has its corresponding universal resource locator URL stored in one of the available locations included in the master document list 204.

As implemented, any document having its corresponding document key included in the document key stack 202 exists in a condition known as strongly referenced. In the context of an object oriented operating system that uses garbage collection to reclaim unused memory, such as the Java runtime environment, a reference is much like a pointer to an object in other object oriented systems, a term well known in the art. A reference differs from a pointer in how it interacts with the garbage collection system. The garbage collector will not collect objects that it considers strongly referenced. An object is strongly referenced if a path of references can be found form the root set (which a primordial set of references that are never collected until the whole system is terminated) to the object in question. Documents with their document keys in the document key stack 202 are considered strongly referenced because a path from the root set to the document key stack 202 always exists, and the document key stack 202 has a reference to those documents whose keys it contains, thus completing the path from the root set to the document.

When an object has no references to it at all from the root set, the object is said to be unreachable, and therefore able to be collected as unused memory by the garbage collector.

Some garbage collected object oriented systems, such as the Java runtime environment, also allow for what are called weak references. Weak references act just like strong references in that they are much like pointer to objects in other object oriented computer systems. Weak references differ from strong references in terms of their interactions with the garbage collector. When a path from the root set to an object can be found only by crossing any number of weak references, that object is said to be weakly referenced. Weakly referenced objects may be reclaimed by the garbage collector at any time. However, weakly referenced objects are not unreachable. If the garbage collector has not yet collected the weakly referenced object, it may still be used through the weak reference in all ways that a strongly referenced object may be used. At any time, however, the weakly referenced object may be collected by the garbage collector. Weak references, therefore, are useful for building caches that are flushed only when memory is low of when system performance requires it.

Therefore, as long as a cache memory manager maintains at least a strong reference, the document is not subject to garbage collection. On the other hand, if a document has only associated with it a weak reference, the document is subject to being reclaimed by the garbage collector.

A typical situation where a document that is currently stored in the local cache memory 108 becomes subject to garbage collection is when a particular document has not been recently requested as determined by the scheduling protocol executed by the cache memory manager 200. In this case, the lifetime (i.e., the expected period of time between requests) of the document has probably elapsed and maintaining the document in the local cache memory 108 is not memory space efficient since it be precludes other more recently requested documents from being stored locally in the local cache memory 108. By abolishing the strong reference to the least recently requested document, that particular document becomes subject to being reclaimed from the local cache memory during a subsequent garbage collection cycle since it now only has a weak reference associated with it. In this way, valuable cache memory is made available for locally storing more recently requested documents. On the other hand, if sufficient memory is available so that garbage collection is not deemed necessary, the weakly referenced document will remain in the cache until garbage collection does indeed occur.

Figure 3:
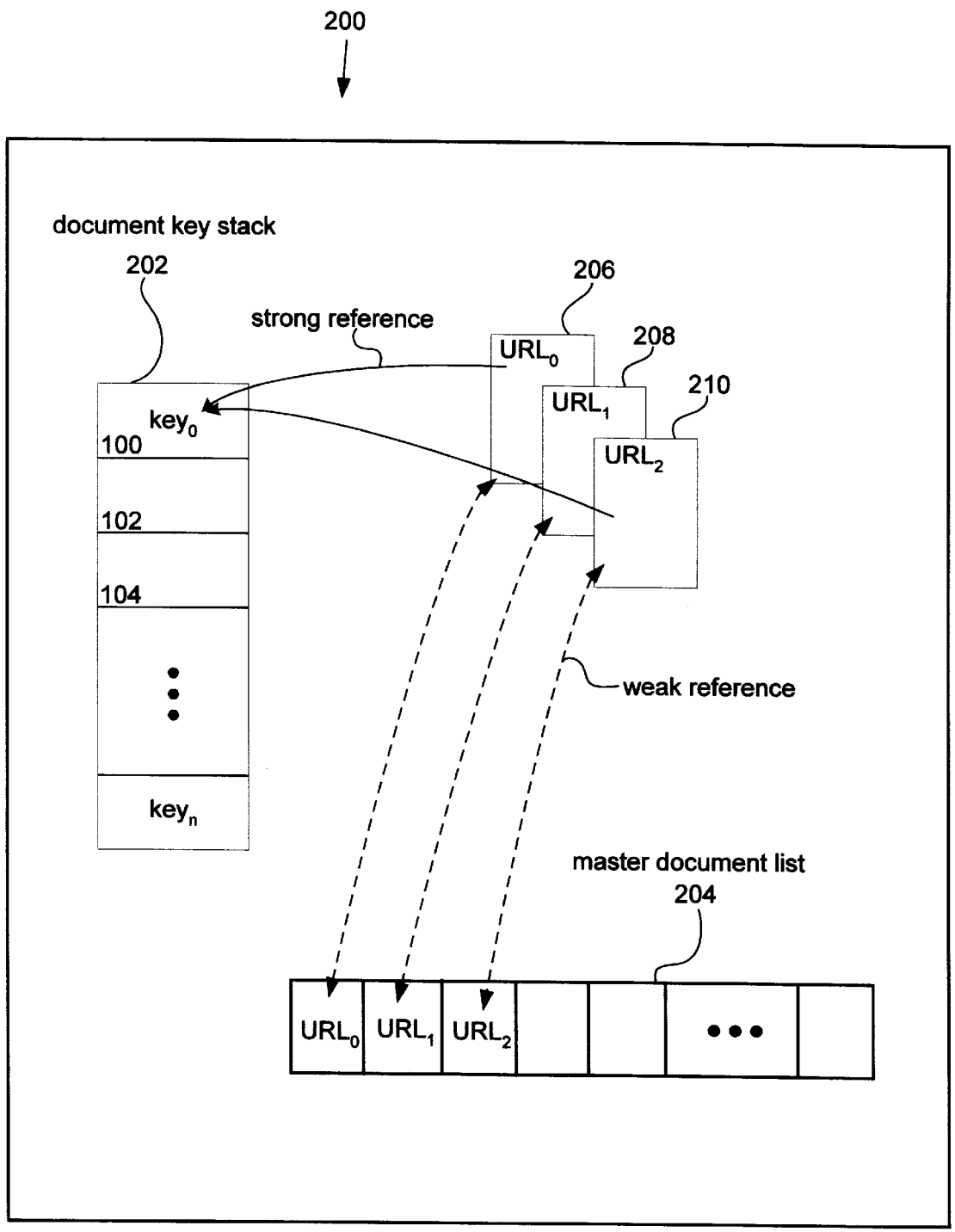
FIG. 3 illustrates a situation where the document that has not been recently requested and as such its document key has been dropped from the document key stack.

By way of example, FIG. 3 illustrates a situation where the document 208 has not been recently requested and as such its document key key, has been dropped from the document key stack 202. Another situation where the document key can be dropped from the document key stack 202 is when the depth of document key stack 202 itself is reduced such that certain of the document keys stored therein are dropped. In either case, any document not having its corresponding document key included in the document key stack 202 will result in the corresponding strong reference being abolished thereby leaving only a weak reference from the master document list 204 to the document 208. In this situation, only the document 208 will be reclaimed from the local cache memory 108 during a subsequent garbage collection cycle leaving documents 206 and 210 stored in the local cache memory 108.

Therefore, in those situations where local cache memory space is limited, it would be desirable to have a relatively greater number of documents having only weak references in comparison to those documents having a strong reference. In this way, those documents having only a weak reference will be reclaimed during garbage collection thereby selectively freeing up valuable cache memory space during garbage collection.

However, in those situations where having documents readily available for local retrieval, such as in browser type applications, where availability of local memory space is less of a concern than system performance, then having a relatively greater number of documents having a strong reference in comparison to those files having only weak references is desirable. In this way, garbage collection will not purge those documents having a strong reference thereby leaving only those documents stored in the local cache memory 108.

Figure 4:
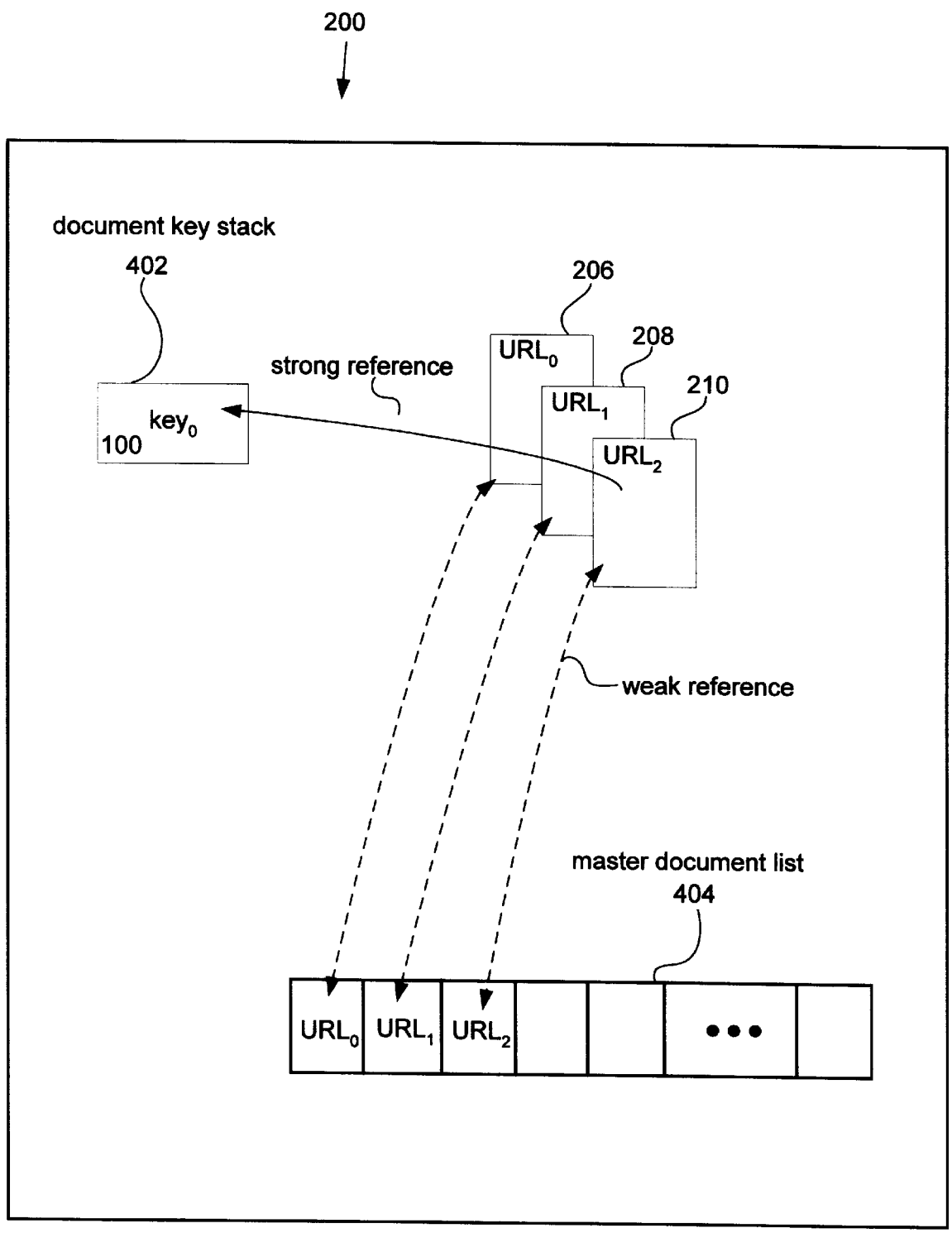
FIG. 4 illustrates a new document key stack that has been created by the cache memory manager having a reduced number of locations in accordance with an embodiment of the invention.

Therefore, in accordance with an embodiment of the invention, the cache memory manager 200 provides the capability of selectively choosing which documents and how many documents have strong references in relation to those documents having only a weak reference. An example of this capability is shown in FIG. 4 where a new document key stack 402 has been created by the cache memory manager 200 having only a single location 402 for storing document keys. By reducing the number of document keys that can be stored in the document key stack 400, the number of documents having an associated strong reference is commensurably reduced. In this way, more documents stored in the local cache memory 108 are subject to garbage collection thereby periodically freeing up valuable cache memory space. This arrangement is appropriate for use in those applications where local memory is severely constrained, as in Internet telephones, and the like.

More particularly, in the situation shown in FIG. 4, the documents 206 and 208 no longer have their respective document keys stored in the document key stack 402 and are thus subject to being reclaimed from the local memory 108 during a subsequent garbage collection cycle. It should be noted, however, that a weak reference to the master document list 404 still remains valid. This retention of the weak reference to the master document list 404 facilitates re-inserting the document key into the document key stack 202 associated with the document 206, for example, when the document 206 is again (if ever) requested.

In this way, the ratio of those documents having an associated strong reference to those having only a weak reference can be adjusted by increasing or decreasing the depth (i.e., number of available locations) of the document key stack. By adjusting this ratio, the number (and kind) of documents reclaimed during garbage collection can adjusted accordingly, based upon such factors as available cache memory space, browser traffic, etc.

Figure 5:
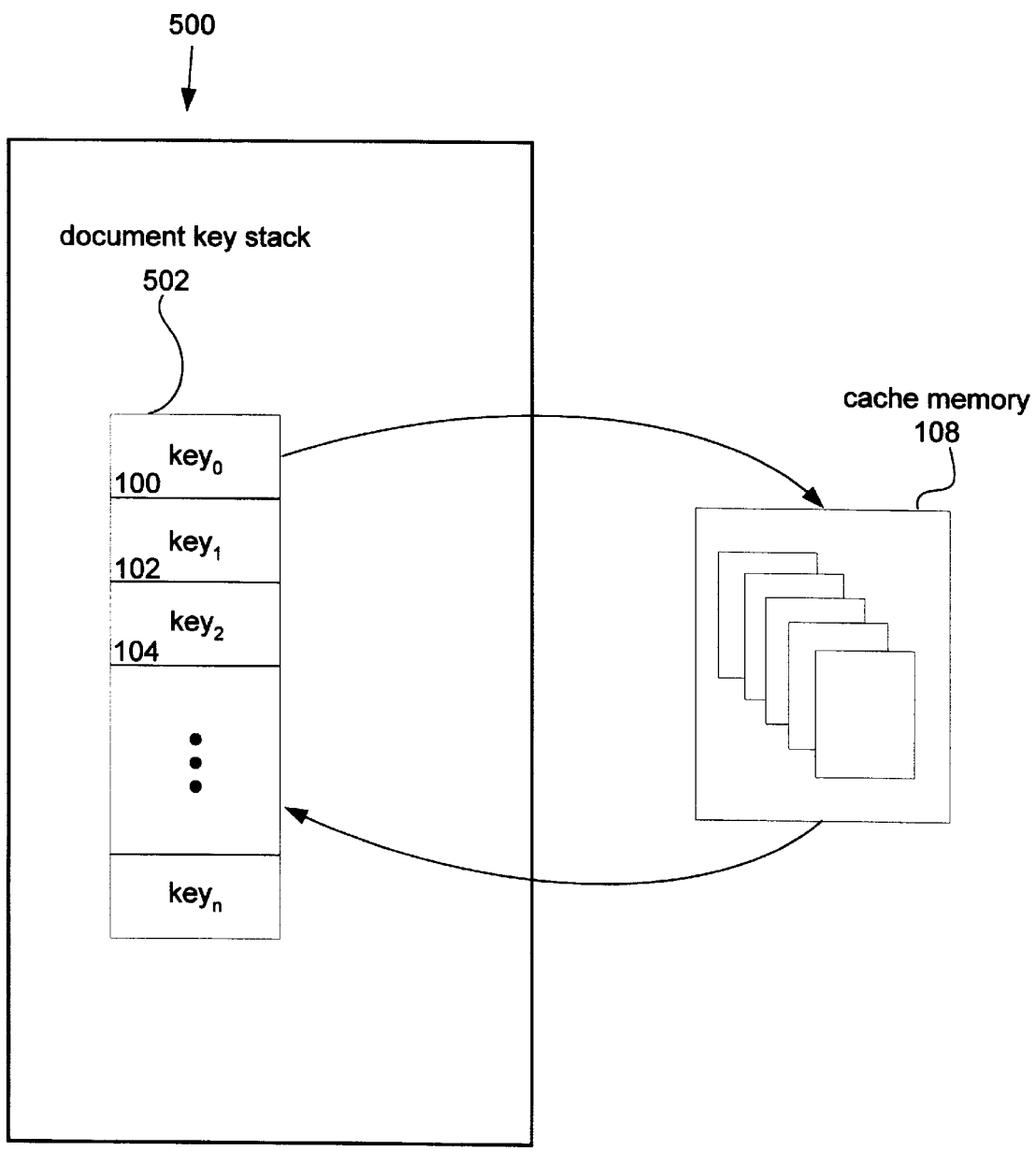
FIG. 5 illustrates a self regulating cache memory manager in accordance with an embodiment of the invention.
Figure 6:
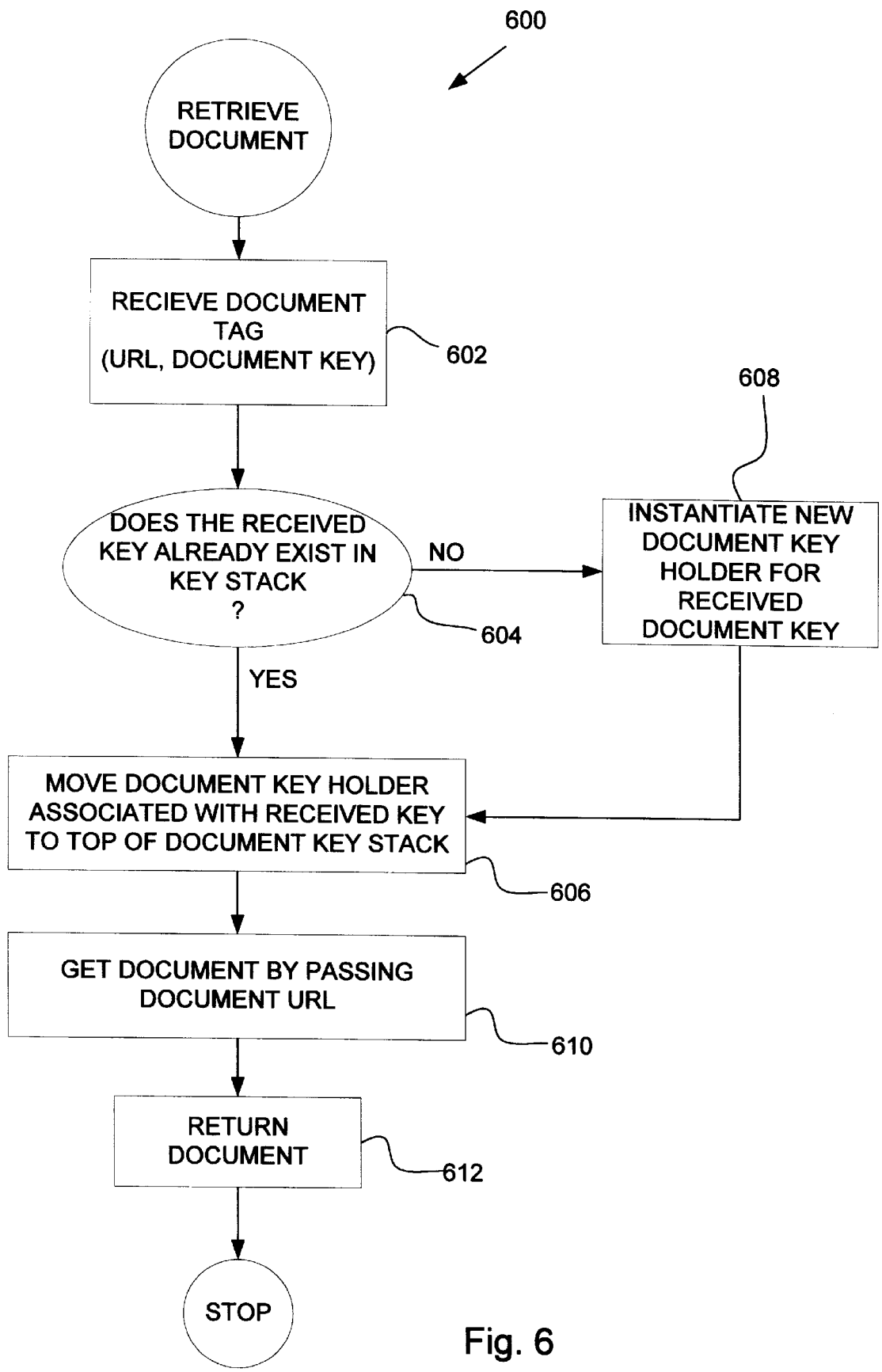
FIG. 6 shows a flowchart detailing a process for retrieving a document in accordance with an embodiment of the invention.

For example, if cache memory space is limited, then the depth of the document key stack can be reduced such that relatively fewer documents have strong references thereby increasing the number of documents having only a weak reference and thereby subject to garbage collection. Conversely, by increasing the depth of the document key stack, relatively more documents can be made to have a strong reference and thereby not subject to garbage collection resulting in an increase in the number of documents stored locally. It should be noted, that it is contemplated that by dynamically linking the depth of the document key stack to the available memory space of the local cache memory 108, a self regulating cache memory manager 500 can be implemented as shown in FIG. 5. The self regulating cache manager 500 periodically determines the amount of available memory space in the local cache memory 108 and based upon that determination, varies the depth of a document key stack 502. By way of example, if it is determined that the available cache memory space in the cache memory 108 is less than an predetermined threshold, then the number of locations in the document key stack 502 is reduced. In this way, the number of files reclaimed during a subsequent garbage collection cycle is increased so as to increase the available cache memory space. In other situations, the self regulating cache manager 500 can periodically vary the depth of the document key stack 502 based upon other factors, such as overall system performance, etc. Referring now to FIG. 6, a flowchart detailing a process 600 for retrieving a document in accordance with an embodiment of the invention is shown. The process 600 begins at 602 when the cache memory manager receives a document tag corresponding to a requested document. In the described embodiment, the document tag includes the document key and an associated universal resource locator LTRL unique to the requested document. The cache memory manager then determines if the document key is present in the document key stack at 604. If the document key is present, then the document key holder associated with the document key is moved to the top of the document key stack at 606. In this way, the most recently requested documents are preferentially stored in the local cache memory over the least recently requested documents. Returning to 604, if the document key holder is not present in the document key stack, then a new document key holder is instantiated at 608 and the instantiated document key holder is moved to the top of the document key stack at 606. By managing the most recently requested document keys, the cache memory manager is capable of maintaining the most recently requested documents stored within the cache memory. In this way, the ratio of hits to misses is substantially reduced thereby improving system performance.

In either case, once the document key holder has been added to the top of the document key stack, the document associated with the document tag comprising the document key holder and the document URL is retrieved at 610 and returned at 612.

Figure 7:
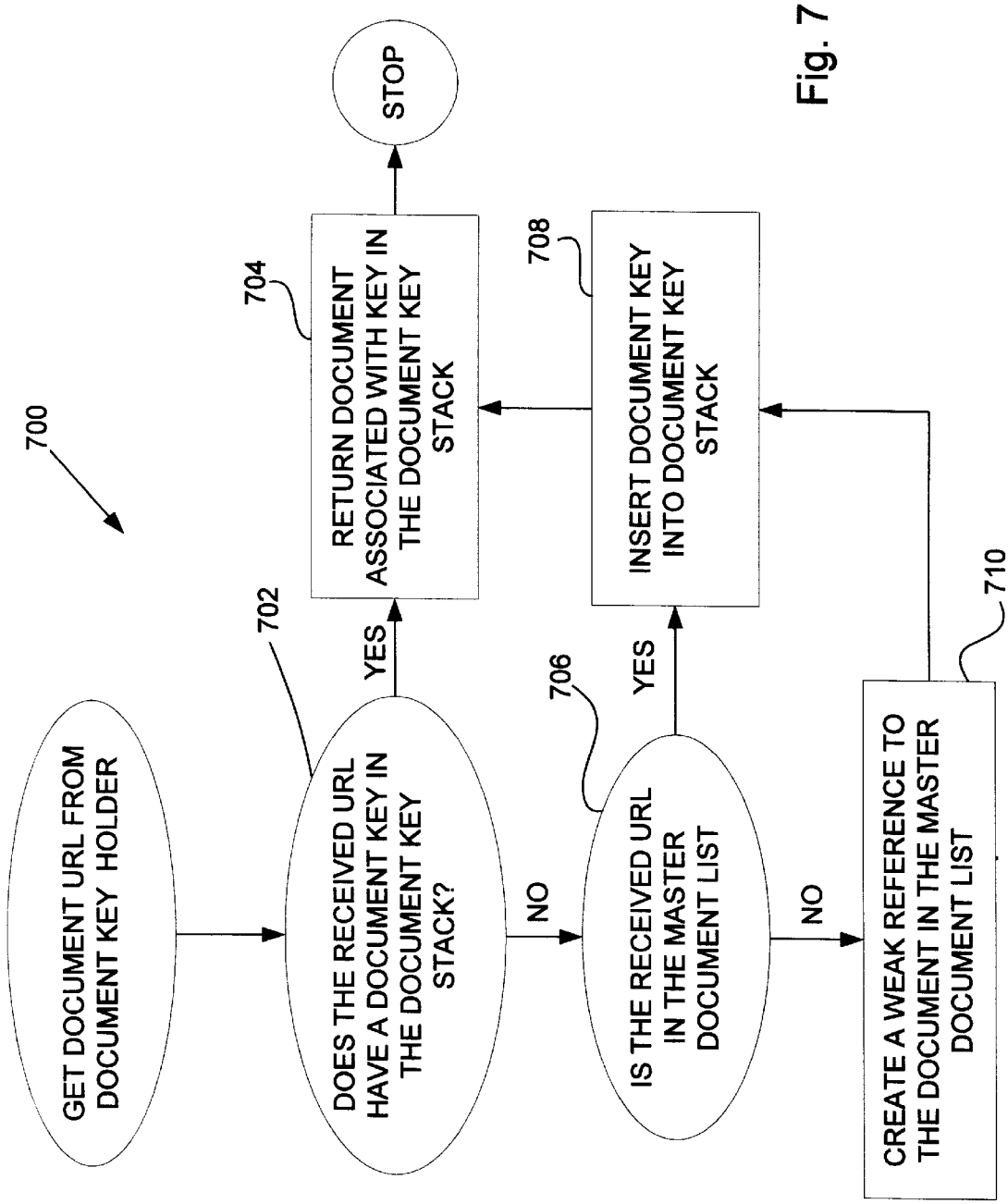
FIG. 7 is a flowchart detailing a process for retrieving a document using the associated document key and document URL in accordance with an embodiment of the invention.

FIG. 7 is a flowchart detailing the process 610 for retrieving a document using the associated document key and document URL in accordance with an embodiment of the invention. The process 610 begins at 702 wherein the cache memory manager determines if the received document tag that includes the document URL is present in the document key stack. When the document tag is present in the document key stack, the associated document is stored in the cache memory and is not reclaimable by the garbage collector since it has a strong reference associated with it. When the document tag is present in the document key stack, , the document associated with the document tag that includes the received document URL and corresponding document key is returned at 704. Alternatively, if the document tag is not present in the document key stack, then a determination is made at 706 whether or not the received document URL is present in the master document list. In those situations where a document key associated with a requested document is not located in the document key stack but does have its document URL located in the master file stack, the document is stored in the cache memory but is subject to being reclaimed by the garbage collector. The requested document, therefore, must have a strong reference associated with it before the next garbage collection cycle. If present in the master document list, then the document key is appropriately inserted into the document key stack at 708. If, however, the received document URL is not present in the master document list, then a weak reference is created to the document in the master document list at 710. In this way, by inserting the document key into the document key stack, a strong reference is established for the corresponding document thereby precluding it from being reclaimed during garbage collection. In either case, control is passed to 704 where the document is returned.

Figure 8:
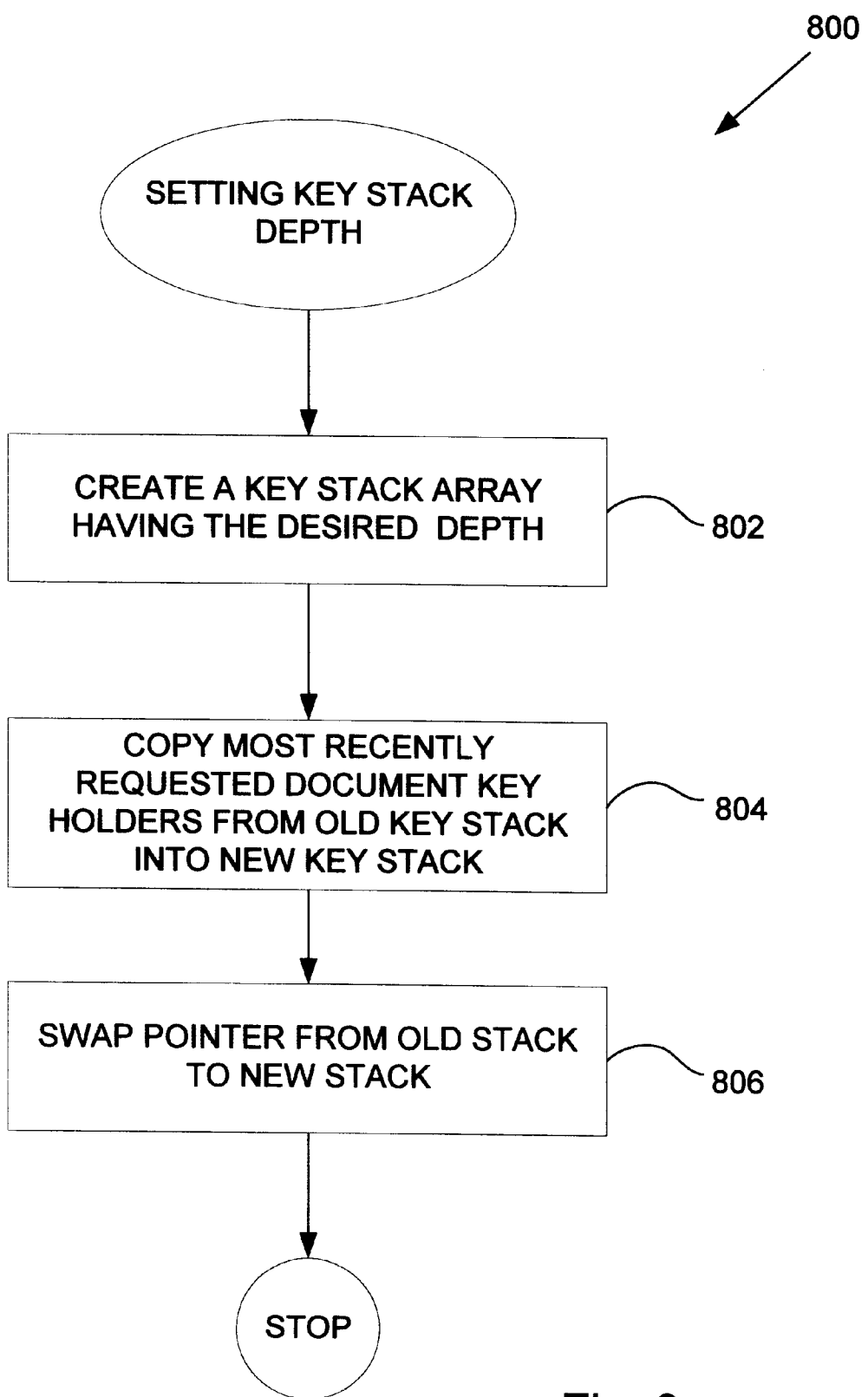
FIG. 8 is a flowchart detailing a process for setting a reference key stack depth in accordance with an embodiment of the invention.
Figure 9:
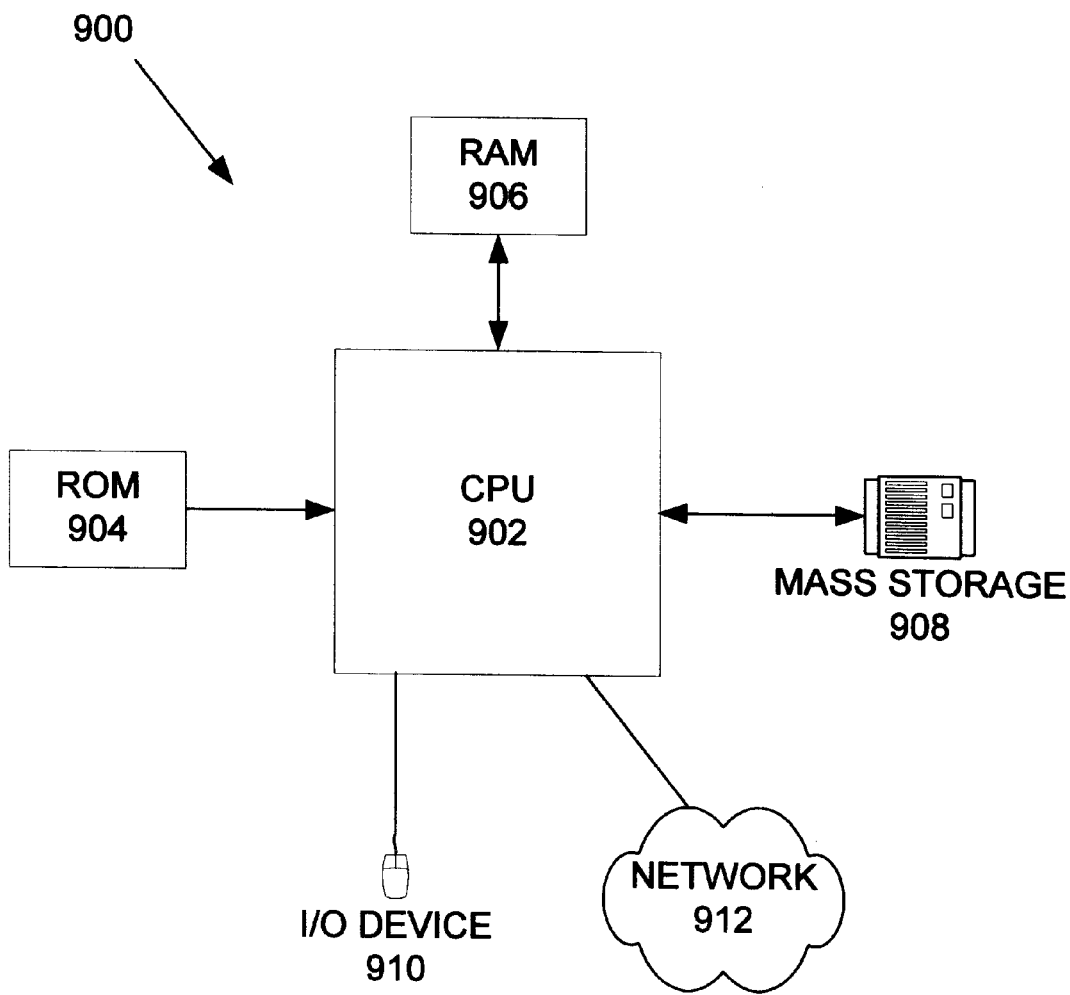
FIG. 9 shows a general computer system useful in implementing the invention.

As discussed above, the document key stack can be adjusted in those situations where system performance is dynamically dependent upon the available cache memory space. Such a process of adjusting the depth of a document key stack is illustrated in FIG. 8 detailing a process 800 in accordance with an embodiment of the invention. The process 800 begins at 802 by creating an array having the desired key stack depth. The key stack depth is typically directly proportional to the number of documents stored in the cache memory having associated strong references. In those cases, for example, where cache memory space is limited, the key stack depth is commensurably reduced in order to accommodate only the most recently retrieved documents. On the other hand, when cache memory space is not a constraining factor, or where system performance is of greater importance, then the key stack depth is commensurably increased. At 804, the most recently requested document key holders are copied from the old array to the new array. In this way, the scheduling protocol heretofore followed is maintained even though the number of documents having associated document keys in the adjusted key stack has changed based upon the change in key stack depth. At 806, the pointer to the old array is swapped to the new array thereby replacing the old key stack array with the new key stack array having the adjusted key stack depth.

Computer system 900 or, more specifically, CPUs 902, may be arranged to support a virtual machine, as will be appreciated by those skilled in the art. As is well known in the art, ROM acts to transfer data and instructions uni-directionally to the CPUs 902, while RAM is used typically to transfer data and instructions in a bi-directional manner. CPUs 902 may generally include any number of processors. Both primary storage devices 904, 906 may include any suitable computer-readable media. A secondary storage medium 908, which is typically a mass memory device, is also coupled bi-directionally to CPUs 902 and provides additional data storage capacity. The mass memory device 908 is a computer-readable medium that may be used to store programs including computer code, data, and the like. Typically, mass memory device 908 is a storage medium such as a hard disk or a tape which generally slower than primary storage devices 904, 906. Mass memory storage device 908 may take the form of a magnetic or paper tape reader or some other well-known device. It will be appreciated that the information retained within the mass memory device 908, may, in appropriate cases, be incorporated in standard fashion as part of RAM 906 as virtual memory. A specific primary storage device 904 such as a CD-ROM may also pass data uni-directionally to the CPUs 902.

CPUs 902 are also coupled to one or more input/output devices 910 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 902 optionally may be coupled to a computer or telecommunications network, e.g. an Internet network or an intranet network, using a network connection as shown generally at 912. With such a network connection, it is contemplated that the CPUs 902 might receive information from the network, or might output information to the network in the course of performing the above-described method steps. Such information, which is often represented as a sequence of instructions to be executed using CPUs 902, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention. By way of example, any form of digitized information storable in a cache memory can be used, such as images, text files, etc.

Although the methods of managing a cache memory in accordance with the present invention are particularly suitable for implementation with respect to a Java™ based environment, the methods may generally be applied in any suitable object-based environment. In particular, the methods are suitable for use in platform-independent object-based environments. It should be appreciated that the methods may also be implemented in some distributed object-oriented systems.

While the present invention has been described as being used with a computer system that has an associated web browser, it should be appreciated that the present invention may generally be implemented on any suitable object-oriented computer system having a cache memory. Therefore, the present examples are to be considered as illustrative and not restrictive, and the invention is not to be limited to the details given herein, but may be modified within the scope of the appended claims along with their full scope of equivalents.

What is claimed is:

1. A computer implemented cache memory manager for managing memory space in a cache memory, comprising:

a document key stack having a depth of stack locations each being arranged to store a document key associated with a document stored in the cache memory, wherein the presence of the document key in the document key stack indicates that the associated document has a strong reference associated therewith;

a master document file having a plurality of file locations each being arranged to store a document identifier used to uniquely identify an associated document stored in the cache memory, wherein the presence of the document identifier in the master document file indicates that the associated document has only a weak reference associated therewith; and a garbage collector arranged to reclaim those documents stored in the cache memory that are only weakly referenced and not those documents that are strongly referenced such that cache memory space commensurate with the reclaimed documents is periodically made available to store more recently requested documents.

2. A cache memory manager as recited in claim 1, wherein the depth of the document key stack is varied in direct proportion to the number of strongly referenced documents stored in the cache memory.

3. A cache memory manager as recited in claim 2, wherein when a document having a document identifier is most recently requested, a determination is made if a document key associated with the most recently requested document is present in the document key stack.

4. A cache memory manager as recited in claim 3, wherein if the document key is present in the document key stack, the document key is moved to a first document key stack location such that the most recently requested document is the most likely document to be retained in the cache memory.

5. A cache memory manager as recited in claim 3, wherein if the document key is not present in the document key stack, then a determination is made if the document identifier associated with the most recently requested document is present in the master document file.

6. A cache memory manager as recited in claim 5, wherein if the document identifier is present in the master document file, a document key associated with the most recently requested document is instantiated and inserted into a first document key stack location such that the most recently requested document is the most likely document to be retained in the cache memory.

7. A cache memory manager as recited in claim 5, wherein if the document identifier associated with the most recently requested document is not present in the master document file, the document identifier is inserted into the master document file and a document key associated with the most recently requested document is instantiated and inserted into a first document key stack location such that the most recently requested document is the most likely document to be retained in the cache memory.

8. A cache memory manager as recited in claim 2, wherein when the depth of the document key stack is reduced, the quantity of documents stored in the cache memory reclaimed by the garbage collector is increased, thereby making available cache memory space suitable for retaining more recently requested documents.

9. A cache memory manager as recited in claim 2, wherein when the depth of the document key stack is increased, the quantity of documents stored in the cache memory reclaimed by the garbage collector is decreased, thereby increasing the quantity of documents available for retrieval from the cache memory.

10. A cache memory manager as recited in claim 1, wherein the cache memory is coupled to a web browser.

11. A cache memory manager as recited in claim 10, wherein the document is a Hyper Text Markup Text (HTML) document.

12. A cache memory manager as recited in claim 11, wherein the document identifier is a universal resource locator (URL) that uniquely identifies the requested document in the context of the Internet.

13. A cache memory manager as recited in claim 1, wherein the document key stack and the master document file take the form of a self cleaning hash table.

14. A computer implemented method for managing available cache memory space in a cache memory by a cache memory manager, wherein the cache memory manager includes a document key stack having a depth of stack locations each being arranged to store a document key associated with a document stored in the cache memory, wherein the presence of the document key in the document key stack indicates that the associated document has a strong reference associated therewith, a master document file having a plurality of file locations each being arranged to store a document identifier used to uniquely identify an associated document stored in the cache memory, wherein the presence of the document identifier in the master document file indicates that the associated document has only a weak reference associated therewith, and a garbage collector arranged to reclaim those documents stored in the cache memory that are only weakly referenced and not those documents that are strongly referenced, comprising:

determining if a document key associated with a requested document is present in the document key stack;

moving the document key associated with the requested document to a first stack location when the document key is determined to be present in the document key stack; and reclaiming those documents stored in the cache memory that do not have corresponding document keys present in the document key stack by the garbage collector, such that cache memory space commensurate with the reclaimed documents is periodically made available to store more recently requested documents.

* * * * *